US006950989B2

(12) United States Patent
Rosenzweig et al.

(10) Patent No.: US 6,950,989 B2
(45) Date of Patent: Sep. 27, 2005

(54) TIMELINE-BASED GRAPHICAL USER INTERFACE FOR EFFICIENT IMAGE DATABASE BROWSING AND RETRIEVAL

(75) Inventors: Elizabeth Rosenzweig, Newton, MA (US); Prasad V. Prabhu, Macedon, NY (US)

(73) Assignee: Eastman Kodak Company, Rochester, NY (US)

( * ) Notice: Subject to any disclaimer, the term of this patent is extended or adjusted under 35 U.S.C. 154(b) by 597 days.

(21) Appl. No.: 09/742,028

(22) Filed: Dec. 20, 2000

(65) Prior Publication Data

US 2002/0075322 A1 Jun. 20, 2002

(51) Int. Cl.[7] .............................................. G11B 27/00
(52) U.S. Cl. ...................... 715/721; 715/854; 715/725; 715/722; 715/720; 715/855
(58) Field of Search ................................ 715/854, 855, 715/721, 720–22, 725; 345/853, 854, 835, 700, 776, 846

(56) References Cited

U.S. PATENT DOCUMENTS

| | | | | | |
|---|---|---|---|---|---|
| 5,493,677 | A | * | 2/1996 | Balogh et al. | ............ 707/104.1 |
| 5,982,369 | A | * | 11/1999 | Sciammarella et al. | ..... 345/835 |
| 6,097,389 | A | * | 8/2000 | Morris et al. | ................ 345/804 |
| 6,311,189 | B1 | * | 10/2001 | deVries et al. | .............. 707/102 |
| 6,335,742 | B1 | * | 1/2002 | Takemoto | ................... 715/781 |
| 6,396,963 | B2 | * | 5/2002 | Shaffer et al. | .............. 382/305 |
| 6,408,301 | B1 | * | 6/2002 | Patton et al. | ............... 707/102 |
| 6,486,896 | B1 | * | 11/2002 | Ubillos | ....................... 345/784 |
| 6,486,898 | B1 | * | 11/2002 | Martino et al. | ............. 345/853 |
| 6,564,209 | B1 | * | 5/2003 | Dempski et al. | ............... 707/3 |
| 6,567,980 | B1 | * | 5/2003 | Jain et al. | ..................... 725/61 |
| 6,784,925 | B1 | * | 8/2004 | Tomat et al. | .......... 348/207.11 |

\* cited by examiner

Primary Examiner—Kristine Kincaid
Assistant Examiner—Peng Ke
(74) Attorney, Agent, or Firm—David M. Woods (57) ABSTRACT

A multi-layer graphical user interface (GUI) using metadata, provides for timeline metaphoric representations (100A, 100B, 200A, 200B, 300, 400, 500, 600, 700, 800, 900) of pictures in a digital picture database. Icons (104A, 106B, 204A, 208B, 304, 404, 504, 604, 704, 804, 904) representing the points of time by which all of the pictures are categorized are sized according to the relative number of corresponding pictures. The most general view is in the form of a timeline (102A, 102B, 202A, 206B, 302, 402, 502, 602, 702, 802, 902) using either years or decades (when the pictures were taken) as the measuring units. Views linked to the general view further refine the general view with icons (104A, 106B, 204A, 208B, 304, 404, 504, 604, 704, 804, 904) proportionately sized according to the number of pictures corresponding to the categorization represented by the particular icon. The aforementioned further refining views further categorize the pictures according to, for example, month, day of the week, time of day, identified events, and identified people in the pictures.

32 Claims, 6 Drawing Sheets

TIMELINE-BASED GRAPHICAL USER INTERFACE FOR EFFICIENT IMAGE DATABASE BROWSING AND RETRIEVAL

FIELD OF THE INVENTION

The present invention relates to graphical user interfaces in general, and in particular to graphical user interfaces adapted for browsing and retrieval of pictures in digital picture databases.

BACKGROUND OF THE INVENTION

Digital pictures and digital picture albums/collections are proliferating with recent advances in quality and cost reductions. Digital pictures can be stored in common or individual databases that allow a user to retrieve his or her pictures for viewing and reproduction via a computer system. When a large number of pictures are stored in a collection, it is desirable to be able to browse and retrieve selected pictures with a graphical user interface (GUI). Used for such an application, a GUI conveniently organizes and groups database pictures, and allows a user to browse the pictures in one or more displays.

Along with the digital information representing pictures, digital image files can also contain metadata, or information not displayed, which nonetheless characterizes the data comprising the pictures. The metadata can describe the scene in the picture, such as a caption, and can also provide in a straightforward manner, information such as the date and time the picture was captured, the location from which the picture was captured, identify people or objects in the picture, and information regarding format and data structure.

Many prior art digital cameras can be programmed to automatically store along with the actual image, the date and time a picture was captured. More advanced digital cameras can also be programmed to automatically store along with the actual image, the location of picture capture by harnessing automatic location systems. For example, the Global Positioning Satellite (GPS) is a well-known method for pinpointing the location of a special GPS receiver with a fairly high degree of accuracy. Other methods include the use of Radio Triangulation (RT) systems. Using such an approach, a GPS receiver can be either incorporated in the hardware of the digital camera, or located nearby. A subsequent image file will contain not only the raw image data, but also a date and time stamp, along with header information related to the location of the GPS receiver when the image is collected.

Still more advanced digital cameras may contain pattern recognition software for identifying objects and people in an image, and converting such information to metadata.

Whether metadata is entered automatically by the camera, manually via the camera during picture captures, or subsequently into the digital image database, there remains a great need for improved GUIs for efficiently and attractively arranging pictures in a digital image database. More particularly, there remains a need for improved, user-friendly GUIs that give image database users a temporal "feel" for the stored images.

SUMMARY OF THE INVENTION

To address the needs of the prior art identified supra, the present invention provides a graphical user interface adapted to browse and retrieve pictures stored in a digital image database. The graphical user interface includes a metadata decoder adapted to decode metadata stored in digital image files, a first display level and at least a second display level, which display levels are constructed with the aid of decoded metadata. The first display level at least includes a first timeline metaphor representing the span of time over which pictures stored in the database were captured, and a plurality of first icons placed along the first timeline metaphor representing predefined temporal intervals, the first icons being proportionately sized to correspond to the number of pictures captured during a predefined temporal interval. The second display level is linked to the first display level and is triggered by activating one of the first icons. The second display level at least includes a second timeline metaphor, and second icons placed along the second timeline for grouping the pictures represented by the activated first icon, the second icons being proportionately sized to correspond to the number of pictures captured for each grouping.

The present invention also provides a method of producing a graphical user interface (GUI) adapted to browse and retrieve pictures stored in a digital image database. The method includes the steps of decoding metadata stored in digital image files, providing a first GUI level and at least a second GUI level, which GUI levels are constructed with the aid of decoded metadata. The first GUI level at least includes a first timeline metaphor representing the span of time over which pictures stored in the database were captured, and a plurality of first icons placed along the first timeline metaphor representing predefined temporal intervals, the first icons being proportionately sized to correspond to the number of pictures captured during a predefined temporal interval. The second GUI level is linked to the first GUI level and is triggered by activating one of the first icons. The second GUI level at least includes a second timeline metaphor, and second icons placed along the second timeline grouping the pictures represented by the activated first icon, the second icons being proportionately sized to correspond to the number of pictures captured for each grouping.

BRIEF DESCRIPTION OF THE DRAWINGS

Features and advantages of the present invention will become apparent to those skilled in the art from the description below, with reference to the following drawing figures, in which.

DETAILED DESCRIPTION OF THE INVENTION

As will be described below in more detail, the present invention novelly provides a graphical user interface (GUI) which uses a series of linked timeline metaphors with proportionately (with respect to the number of pictures represented by the icon, as will be explained, infra) sized icons to represent the pictures in a digital image database. It will be appreciated by those skilled in the art that the pictures in the image database can be entered by a variety of means, including, inter alia, pictures captured by digital cameras, analog pictures which are quantized into digital images, and images produced by image scanners.

Figure 1A:
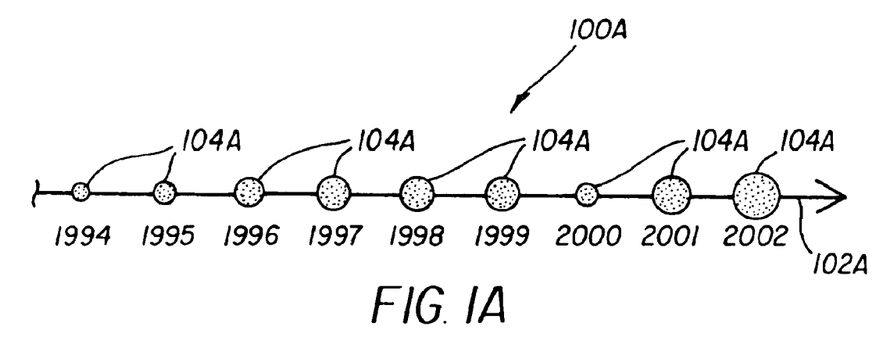
FIG. 1A is a yearly-based timeline display used in the graphical user interface (GUI) of the present invention, the timeline having chronological icons which are proportional in size to the number of pictures in a database corresponding to the identified years.
Figure 1B:
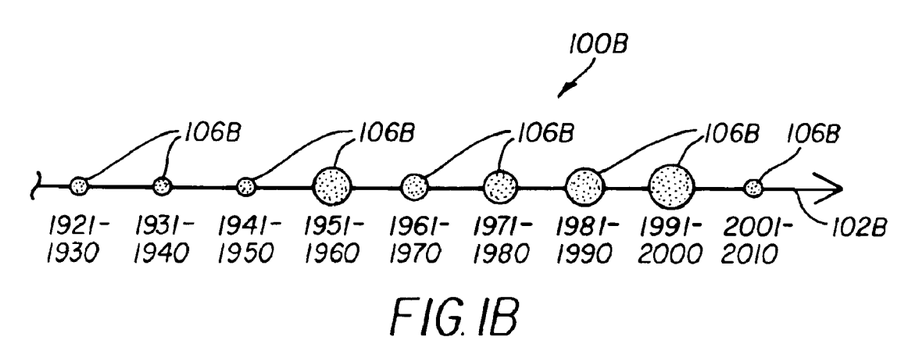
FIG. 1B is an alternate decade-based timeline display suitable for use in the GUI of the present invention, the timeline having chronological icons which are proportional in size to the number of pictures in a database corresponding to the identified decades.

The first level of the GUI of the present invention contains a timeline metaphor (displayed for the user) such as the one 100A in FIG. 1A, or the one 100B in FIG. 1B. The timeline metaphor 100A is marked by the years (of capture) covered by the pictures of the database in question. In an alternate embodiment, the timeline metaphor 100B is marked by the decades (of capture) covered by the database pictures. More particularly, the timeline 102A has year-picture icons 104A evenly spaced with year markers, while the timeline 102B has decade-picture icons 106B evenly spaced with decade markers.

Although shown as circular in shape, the icons 102A can be of any other suitable shape, including (but not limited to) spherical, elliptical, or irregular. More important to the present invention than the shape of the icons 104A and 106B is the fact that the icons are sized to show the relative number of pictures represented by the corresponding time markers. For example, the sample digital image database contains many more pictures captured in the year 2001 than in the year 2000. Consequently, the icon representing to the year 2001 is relatively large, while the icon representing the year 2000 is relatively small. In the alternate embodiment of FIG. 1B, the number of pictures in the sample database captured in the 1991–2000 decade are relatively large, while the number of pictures captured in the 1941–1950 are relatively small. Consequently, the icon sizes are relatively large, and relatively small, respectively.

Figure 2A:
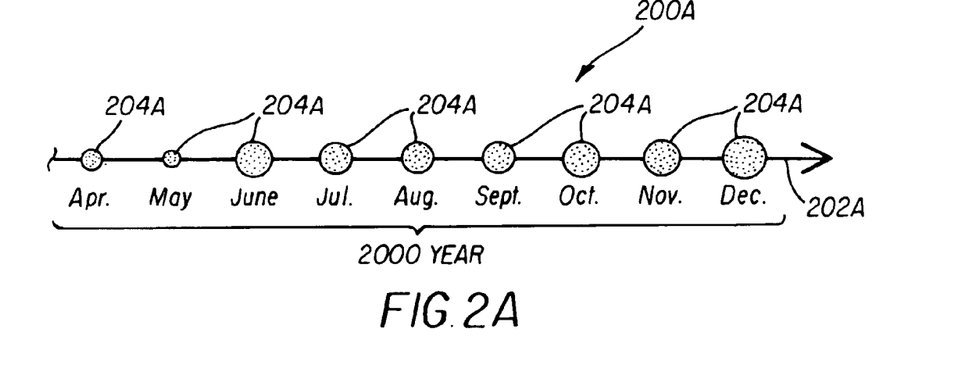
FIG. 2A is a monthly-based display linked to the timeline in FIG. 1A in general, and in particular to a year specified by a user.
Figure 2B:
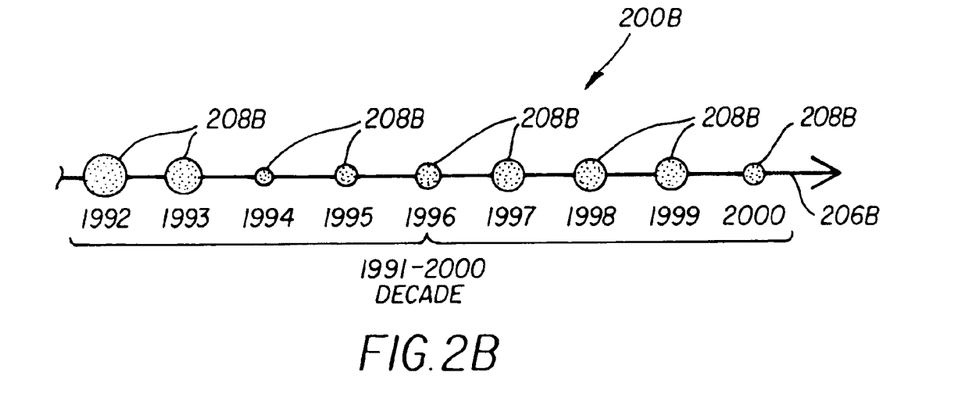
FIG. 2B is a yearly-based timeline display linked to the timeline in FIG. 1B, which has chronological icons which are proportional to the number of pictures in a database corresponding to the years in a decade specified by a user.

To move to the next level of the GUI of the present invention, a user activates one of the year (or decade) icons in FIG. 1A or 1B to produce a new timeline metaphor 200A or 200B shown in either FIG. 2A or 2B for greater temporal specificity. Just as with FIGS. 1A and 1B, the timeline metaphors 200A and 200B contain timelines and relatively sized picture icons.

In the example shown in FIG. 2A, the user has activated (by a click of a pointing device such as a "mouse," for example) the year 2000 icon as being of further interest. That is, the user is interested in browsing pictures captured in the year 2000. The new timeline 202A further refines the year 2000 into the months of the year. From the example, it is apparent by the relative size of the icons 204A, that many more pictures were captured in the month of December than in the Month of May. In the alternate timeline metaphor 200B of FIG. 2B, the user has chosen to further refine the timeline metaphor of FIG. 1B, by showing the year-picture icons 208B on the timeline 206B to display the relative size of pictures captured for each of the years in the 1991–2000 decade. In this example, the pictures captured in the year 1999 are much more numerous than the pictures captured in the year 2000, so that the relative sizes of the corresponding icons are large and small, respectively.

Figure 3:
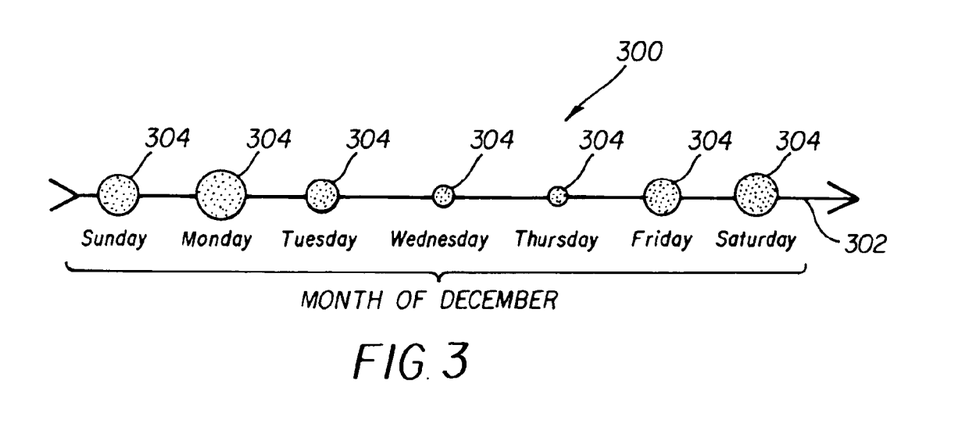
FIG. 3 is a weekly-based (Sunday through Saturday, etc.) display linked to the timeline in FIG. 2A in general, and in particular to a month specified by a user.
Figure 4:
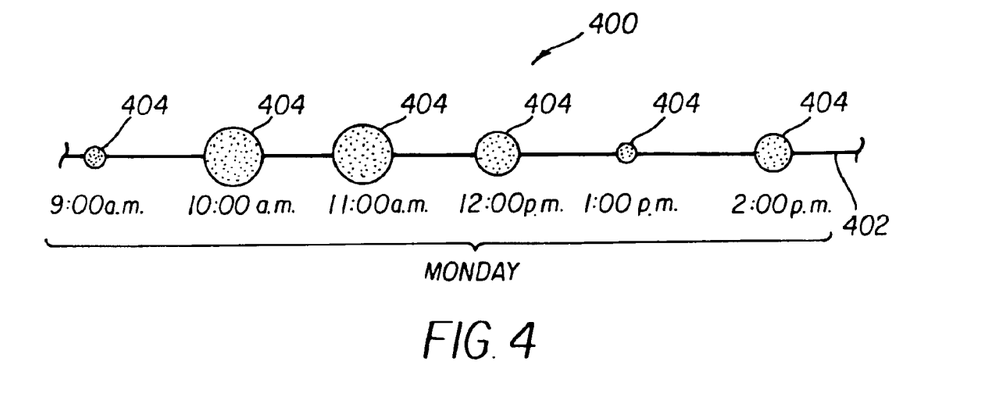
FIG. 4 is a daily-based (by hour of the day) display linked to the timeline in FIG. 3 in general, and in particular to a day of the week specified by a user.
Figure 5:
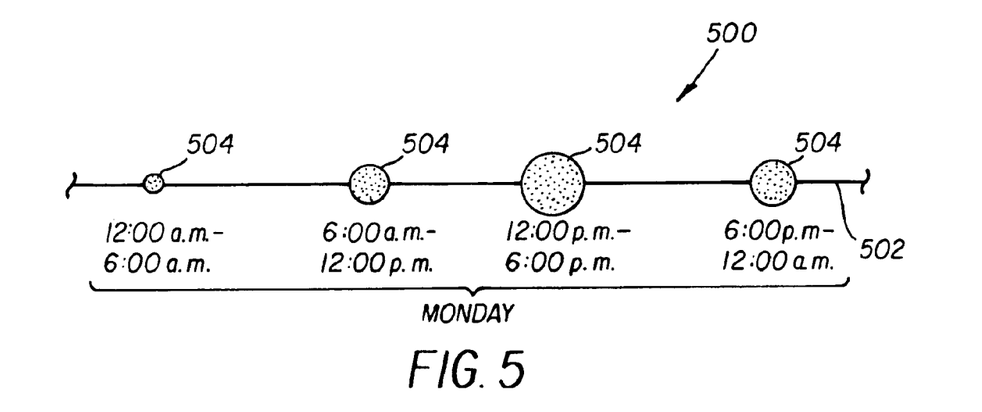
FIG. 5 is an alternate daily-based (by blocks of time) display linked to the timeline in FIG. 3 in general, and in particular to a day of the week specified by a user.

Activating an icon representing the picture grouping of interest can further refine the timeline metaphors of each level of the present-inventive GUI. The timeline metaphor 300 in FIG. 3 is linked to either the timeline metaphor 200A or 200B, and groups the pictures in the image database according to the days of the week with a timeline 302 and day icons 304, which are, again, proportionately sized to represent the relative number of pictures grouped according to the days of the week. The timeline metaphor 400 in FIG. 4 is linked to the timeline metaphor 300 in FIG. 3, and groups the pictures in the image database according to the time of day with a timeline 402 and day icons 404. In the example shown, the pictures captured on all Mondays are grouped according to their capture time. An alternate embodiment of the timeline metaphor 400 in FIG. 4 is the timeline metaphor 500 in FIG. 5, where instead of grouping the pictures of a particular day by the hour of capture, the pictures are grouped by a block of time.

Figure 6:
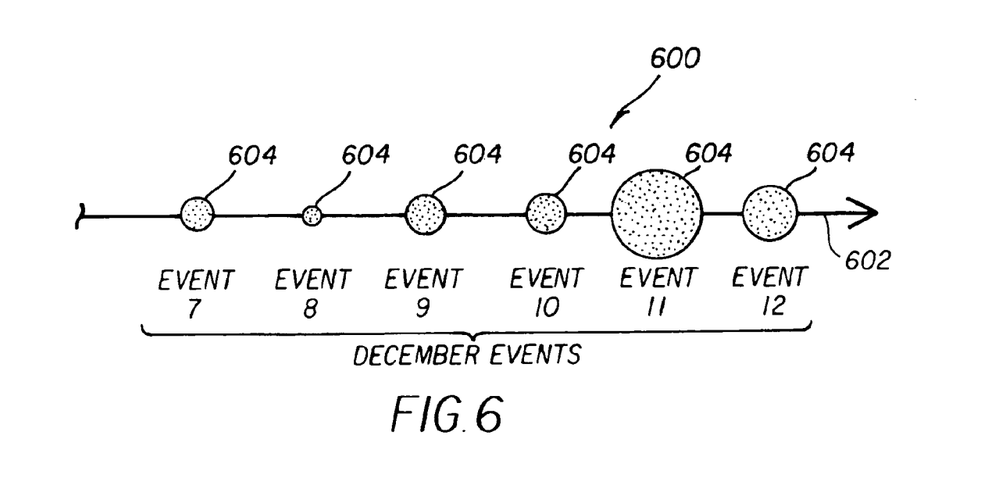
FIG. 6 is an event-based display linked to the timeline in FIG. 2A in general, and in particular to a month specified by a user.

The GUI of the present invention allows a user to display metaphors which group the pictures in a digital image database in other ways besides the date or time of capture by linking timeline metaphors to other metaphors. The display line 602 in FIG. 6 displays proportionately sized icons 604 which group the database pictures according to events specified by a user inputting the pictures. Linked to the timeline metaphor 200A in FIG. 2A, the metaphor 600 in FIG. 6 groups the pictures captured in a particular month— December in the example—into identifiable events, such as birthdays, holidays, etc. For example, the "Event 11" icon might represent pictures captured on Christmas Day, while the "Event 12" icon might represent pictures captured on New Year's Eve.

Figure 7:
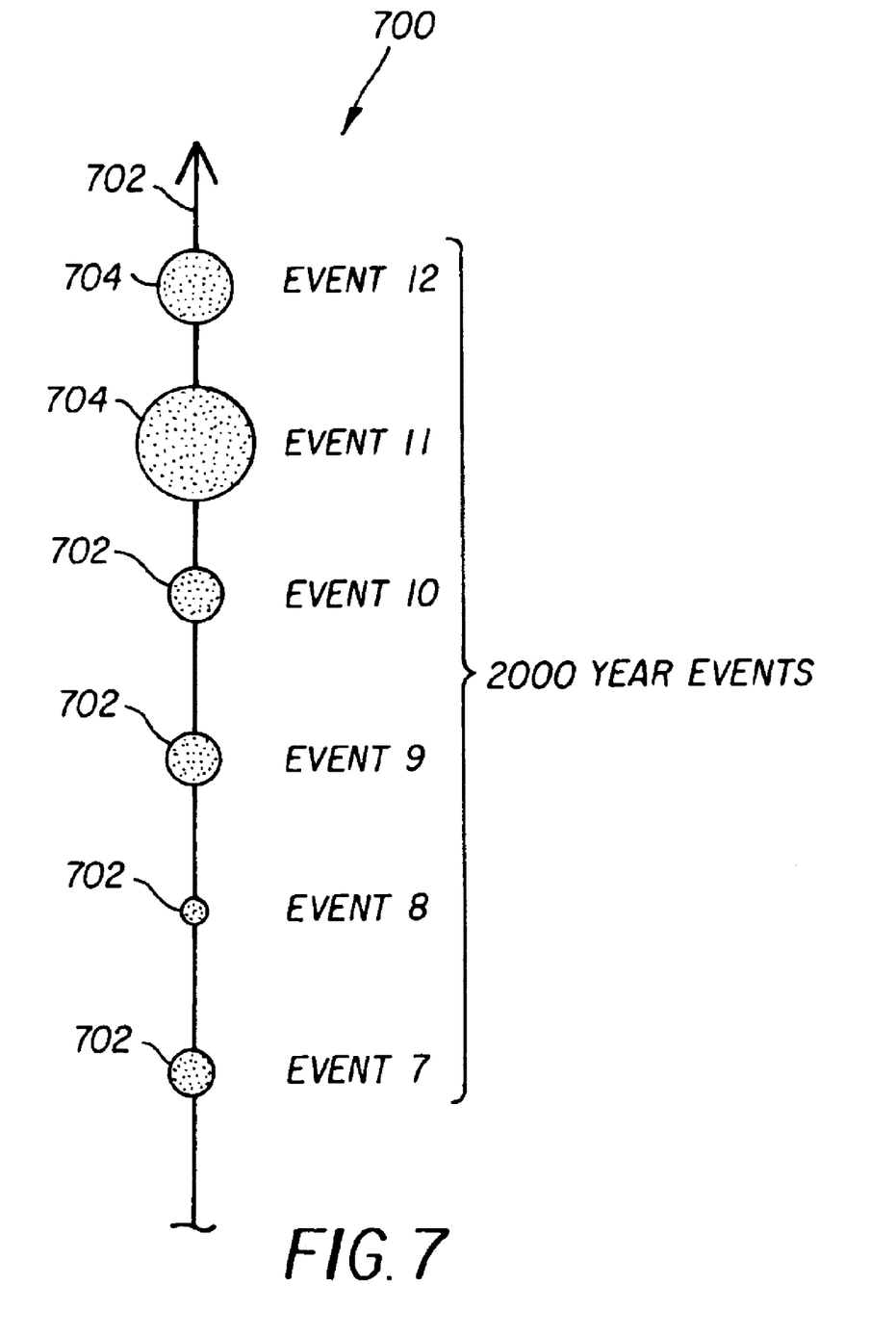
FIG. 7 is an alternate embodiment (vertical) of the display in FIG. 6.

While the metaphors of the GUI of the present invention might generally be oriented in a common direction, different levels might be displayed in an orthogonal direction relative to previous linked levels, such as the metaphor 700 in FIG. 7, which might be linked to the timeline metaphor 100A in FIG. 1A.

Figure 8:
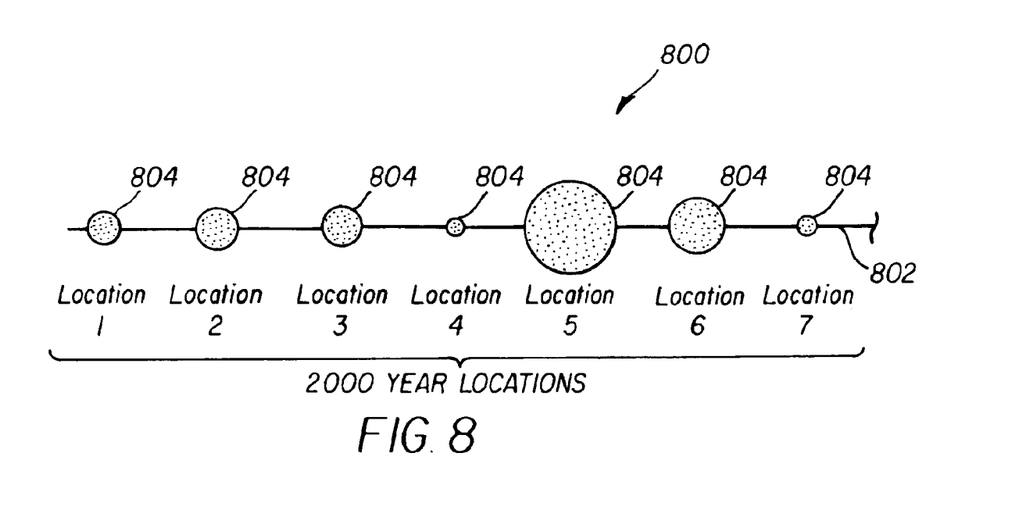
FIG. 8 is a location-based display linked to the timeline in FIG. 2A in general, and in particular to a year specified by a user.

In addition to grouping pictures according to specific events, the GUI of the present invention can also provide linked views which group database pictures according to stored characteristics such as the location of capture, and identifiable persons in pictures. The display 800 in FIG. 8 is an example of a line 802 with proportionately sized location icons 804 linked to a particular year (2000 in the example) on the timeline 102A in FIG. 1A. It is apparent from FIG. 8 that the many more pictures were captured at "Location 5" than at "Location 4."

Figure 9:
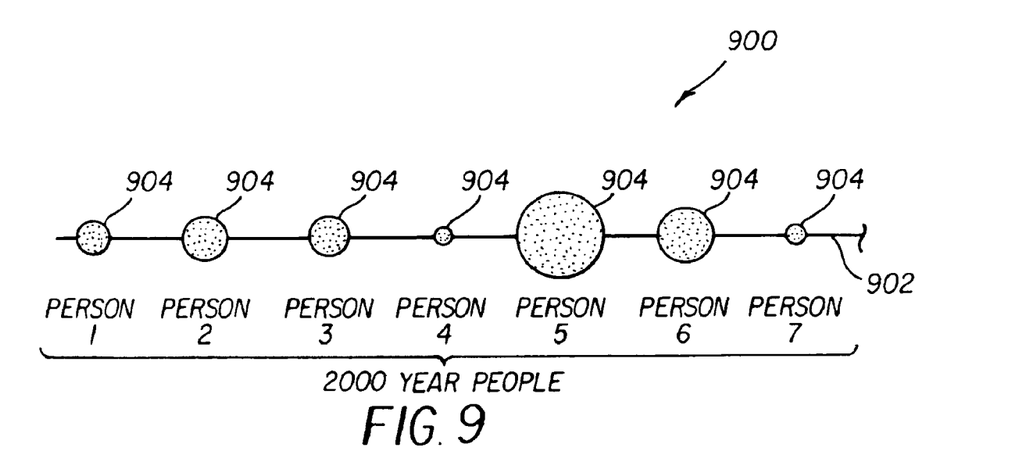
FIG. 9 is a person-based display linked to the timeline in FIG. 2A in general, and in particular to a year specified by a user.

The display 900 in FIG. 9 is an example of a line 902 with proportionately sized "people" icons 904 linked to a particular year (2000 in the example) on the timeline 102A in FIG. 1A. It is apparent from FIG. 9 that the many more pictures were captured of "Person 5" in that year than of "Person 4." For example, "Person 5" might be a newborn baby, while "Person 4" might be a person who often takes pictures, but seldom has pictures taken of himself/herself.

Figure 10:
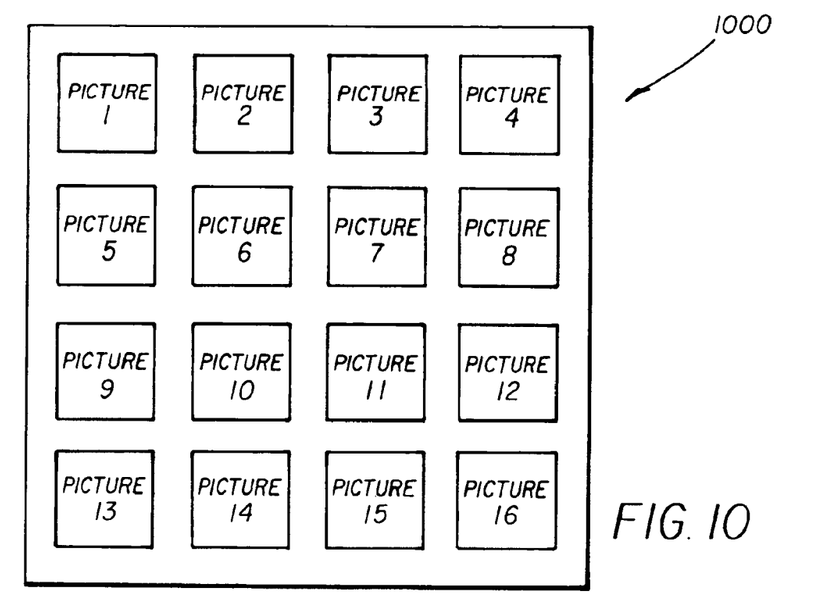
FIG. 10 is a thumbnail display of pictures in a database that are linked to the timeline displays of the previous drawing figures.

When there are no more timeline metaphors, or other picture grouping metaphors after a given level in the present-inventive GUI has been reached, or when desired by the user (if the viewing screen does not become undesirably cluttered), the next level is a display 1000 in FIG. 10 showing thumbnails representing all of the pictures currently grouped. For example, if the user activates the "Person 2" icon in the display 900 in FIG. 9, thumbnails of all of the pictures captured during the particular year (2000 year in the example), and featuring or including "Person 2" are displayed.

Figure 11:
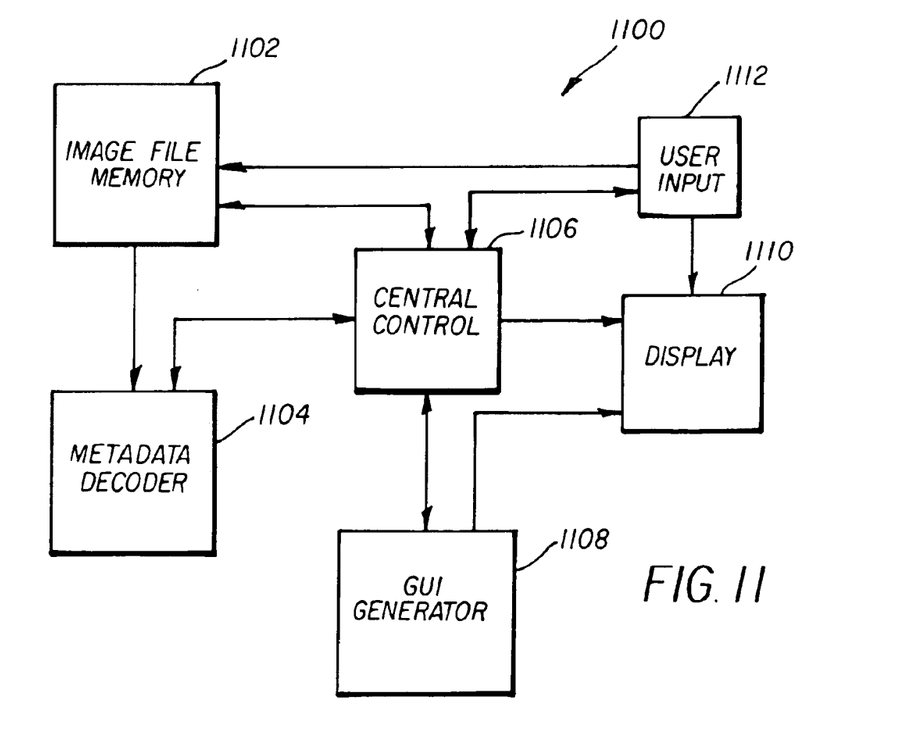
FIG. 11 is a conceptual block diagram of a system used for producing a GUI according to the present invention.

Given the disclosure of this Letters Patent, those skilled in the art will be able to implement a timeline-based GUI for more efficient and user-friendly browsing and retrieval of pictures stored in an image database. However, a general system 1100 for implementing the present invention is illustrated in FIG. 11. The various components of the system 1100 need not have physical proximity. Indeed, the system 1100 can be self-contained in a stand-alone computer system, part of a Local Area Network (LAN), or part of a remote processing system using Wide Area Networks (WANs) such as the Internet, to name a few variations.

The system 1100 includes central control 1106 to control its overall operation, a large image file memory 1102 for storing the digital pictures of a picture database, along with metadata for each picture, and a metadata decoder 1104 for decoding metadata from the image files for use by the system 1100. A GUI generator 1108 generates the display metaphors of the present invention for display via a display 1110 under the direction of a user input 1112 and the central control 1106.

Variations and modifications of the present invention are possible, given the above description. However, all variations and modifications which are obvious to those skilled in the art to which the present invention pertains are considered to be within the scope of the protection granted by this Letters Patent.

PARTS LIST

100A Timeline metaphor
102A Timeline (years)
104A Year-picture icons
100B Timeline metaphor
102B Timeline (decades)
106B Decade-picture icons
200A Timeline metaphor
202A Timeline (year, months)
204A Month-picture icons
200B Timeline metaphor
206B Timeline (decade, years)
208B Year-picture icons
300 Timeline metaphor
302 Timeline (month, days)
304 Day-picture icons
400 Timeline metaphor
402 Timeline (day, time)
404 Time-picture icons
500 Timeline metaphor
502 Timeline (day, time block)
504 Time block-picture icons
600 Timeline metaphor
602 Timeline (month, events)
604 Event-picture icons
700 Timeline (vertical) metaphor
702 Timeline (year, events)
704 Event-picture icons
800 Timeline metaphor
802 Timeline (year, locations)
804 Location-picture icons
900 Timeline metaphor
902 Timeline (year, people)
904 People-picture icons
1000 Thumbnail display
1100 Timeline-based Graphical User Interface (GUI) system
1102 Image file memory
1104 Metadata decoder
1106 Central control
1108 GUI generator
1110 Display
1112 User input

What is claimed is:

1. A graphical user interface adapted to browse and retrieve pictures stored in a digital image database, said graphical user interface comprises:

a metadata decoder adapted to decode metadata stored in digital image files;

a first display level constructed with the aid of decoded metadata, said first display level comprising a first metaphor representing the span of time over which pictures stored in said database were captured, and a plurality of first icons placed on said first metaphor representing predefined temporal intervals, said first icons being proportionately sized to correspond to the number of pictures captured during a predefined temporal interval; and at least a second display level constructed with the aid of decoded metadata and linked to said first display level and triggered by activating one of said first icons, said second display level comprising a second metaphor, and second icons placed on said second metaphor for grouping the pictures represented by the activated first icon, said second icons being proportionately sized to correspond to the number of pictures captured for each grouping.

2. The graphical user interface of claim 1, wherein the time intervals represented by said first icons correspond to years, and said second icons correspond to months, according to decoded metadata.

3. The graphical user interface of claim 2, further comprising:

at least a third display level constructed with the aid of decoded metadata, linked to said second display level and triggered by activating one of said second icons, said third display level comprising a third metaphor, and third icons placed on said third metaphor for grouping the pictures represented by the activated second icon by the day of the week of capture, said third icons being proportionately sized to correspond to the number of pictures captured for each grouping.

4. The graphical user interface of claim 3, further comprising:

at least a fourth display level constructed with the aid of decoded metadata, linked to said third display level and triggered by activating one of said third icons, said fourth display level comprising a fourth metaphor, and fourth icons placed on said fourth metaphor for grouping the pictures represented by the activated third icon by the time of day of capture, said fourth icons being proportionately sized to correspond to the number of pictures captured for each grouping.

5. The graphical user interface of claim 1, wherein the time intervals represented by said first icons correspond to years, and said second icons correspond to identified events during which pictures are captured, according to decoded metadata.

6. The graphical user interface of claim 5, wherein the display position of said second metaphor is substantially perpendicular to the display position of said first metaphor.

7. The graphical user interface of claim 1, wherein the time intervals represented by said first icons correspond to years, and said second icons correspond to identified locations from which pictures are captured, according to decoded metadata.

8. The graphical user interface of claim 1, wherein the time intervals represented by said first icons correspond to years, and said second icons correspond to identified people present in pictures, according to decoded metadata.

9. The graphical user interface of claim 1, wherein the time intervals represented by said first icons correspond to decades during which pictures are captured, and said second icons correspond to years during which pictures are captured, according to decoded metadata.

10. The graphical user interface of claim 1, further comprising an additional display level constructed with the aid of decoded metadata, linked to said second display level and triggered by activating one of said second icons, said additional display level comprising additional level thumbnail icons of the pictures represented by the activated second icon.

11. The graphical user interface of claim 1, wherein the time intervals represented by said first icons correspond to years and said second icons correspond to months, according to decoded metadata, said graphical user interface further comprising an additional display level constructed with the aid of decoded metadata, linked to said second display level and triggered by activating one of said second icons, said additional display level comprising additional level thumbnail icons of the pictures represented by the activated second icon.

12. The graphical user interface of claim 3, further comprising an additional display level constructed with the aid of decoded metadata, linked to said third display level and triggered by activating one of said third icons, said additional display level comprising additional level thumbnail icons of the pictures represented by the activated third icon.

13. The graphical user interface of claim 4, further comprising an additional display level constructed with the aid of decoded metadata, linked to said fourth display level and triggered by activating one of said fourth icons, said additional display level comprising additional level thumbnail icons of the pictures represented by the activated fourth icon.

14. The graphical user interface of claim 1, wherein the time intervals represented by said first icons correspond to years, and said second icons correspond to identified events during which pictures are captured, according to decoded metadata, said graphical user interface further comprising an additional display level constructed with the aid of decoded metadata, linked to said second display level and triggered by activating one of said second icons, said additional display level comprising additional display level thumbnail icons of the pictures represented by the activated second icon.

15. The graphical user interface of claim 1, wherein the time intervals represented by said first icons correspond to years, and said second icons correspond to identified locations from which pictures are captured, according to decoded metadata, said graphical user interface further comprising an additional display level constructed with the aid of decoded metadata, linked to said second display level and triggered by activating one of said second icons, said additional display level comprising additional display level thumbnail icons of the pictures represented by the activated second icon.

16. The graphical user interface of claim 1, wherein the time intervals represented by said first icons correspond to years, and said second icons correspond to identified people present in pictures, according to decoded metadata, said graphical user interface further comprising an additional display level linked to said second display level and triggered by activating one of said second icons, said additional display level comprising additional display level thumbnail icons of the pictures represented by the activated second icon.

17. A method of producing a graphical user interface (GUI) adapted to browse and retrieve pictures stored in a digital image database, said method comprising the steps of:

decoding metadata stored in digital image files;

providing a first GUI level constructed with the aid of decoded metadata, said first GUI level comprising a first metaphor representing the span of time over which pictures stored in said database were captured, and a plurality of first icons placed on said first metaphor representing predefined temporal intervals, said first icons being proportionately sized to correspond to the number of pictures captured during a predefined temporal interval; and providing at least a second GUI level constructed with the aid of decoded metadata, linked to said first GUI level and triggered by activating one of said first icons, said second GUI level comprising a second metaphor, and second icons placed on said second metaphor for grouping the pictures represented by the activated first icon, said second icons being proportionately sized to correspond to the number of pictures captured for each grouping.

18. The method of claim 17, wherein the time intervals represented by said first icons correspond to years, and said second icons correspond to months, according to decoded metadata.

19. The method of claim 18, further comprising the step of:

providing at least a third GUI level constructed with the aid of decoded metadata, linked to said second GUI level and triggered by activating one of said second icons, said third GUI level comprising a third metaphor, and third icons placed on said third metaphor for grouping the pictures represented by the activated second icon by the day of the week of capture, said third icons being proportionately sized to correspond to the number of pictures captured for each grouping.

20. The method of claim 19, further comprising the step of:

providing at least a fourth GUI level constructed with the aid of decoded metadata, linked to said third GUI level and triggered by activating one of said third icons, said fourth GUI level comprising a fourth metaphor, and fourth icons placed on said fourth metaphor for grouping the pictures represented by the activated third icon by the time of day of capture, said fourth icons being proportionately sized to correspond to the number of pictures captured for each grouping.

21. The method of claim 17, wherein the time intervals represented by said first icons correspond to years, and said second icons correspond to identified events during which pictures are captured, according to decoded metadata.

22. The method of claim 21, wherein the display position of said second metaphor is substantially perpendicular to the display position of said first metaphor.

23. The method of claim 17, wherein the time intervals represented by said first icons correspond to years, and said second icons correspond to identified locations from which pictures are captured, according to decoded metadata.

24. The method of claim 17, wherein the time intervals represented by said first icons correspond to years, and said second icons correspond to identified people present in pictures, according to decoded metadata.

25. The method of claim 17, wherein the time intervals represented by said first icons correspond to decades during which pictures are captured, and said second icons correspond to years during which pictures are captured, according to decoded metadata.

26. The method of claim 17, further comprising the step of:
providing an additional GUI level constructed with the aid of decoded metadata, linked to said second GUI level and triggered by activating one of said second icons, said additional GUI level comprising additional GUI level thumbnail icons of the pictures represented by the activated second icon.

27. The method of claim 17, wherein the time intervals represented by said first icons correspond to years and said second icons correspond to months, according to decoded metadata, said method further comprising the step of:
providing an additional GUI level constructed with the aid of decoded metadata, linked to said second GUI level and triggered by activating one of said second icons, said additional GUI level comprising additional GUI level thumbnail icons of the pictures represented by the activated second icon.

28. The method of claim 19, further comprising the step of:
providing an additional GUI level constructed with the aid of decoded metadata, linked to said third GUI level and triggered by activating one of said third icons, said additional GUI level comprising additional GUI level thumbnail icons of the pictures represented by the activated third icon.

29. The method of claim 20, further comprising the step of:
providing an additional GUI level constructed with the aid of decoded metadata, linked to said fourth GUI level and triggered by activating one of said fourth icons, said additional GUI level comprising additional GUI level thumbnail icons of the pictures represented by the activated fourth icon.

30. The method of claim 17, wherein the time intervals represented by said first icons correspond to years, and said second icons correspond to identified events during which pictures are captured, according to decoded metadata, said method further comprising the step of:
providing an additional GUI level constructed with the aid of decoded metadata, linked to said second GUI level and triggered by activating one of said second icons, said additional GUI level comprising additional GUI level thumbnail icons of the pictures represented by the activated second icon.

31. The method of claim 17, wherein the time intervals represented by said first icons correspond to years, and said second icons correspond to identified locations from which pictures are captured, according to decoded metadata, said method further comprising the step of:
providing an additional GUI level constructed with the aid of decoded metadata, linked to said second GUI level and triggered by activating one of said second icons, said additional GUI level comprising additional GUI level thumbnail icons of the pictures represented by the activated second icon.

32. The method of claim 17, wherein the time intervals represented by said first icons correspond to years, and said second icons correspond to identified people present in pictures, according to decoded metadata, said method further comprising the step of:
providing an additional GUI level constructed with the aid of decoded metadata, linked to said second GUI level and triggered by activating one of said second icons, said additional GUI level comprising additional GUI level thumbnail icons of the pictures represented by the activated second icon.

* * * * *